United States Patent
Bansal et al.

(10) Patent No.: US 11,755,295 B2
(45) Date of Patent: Sep. 12, 2023

(54) SOFTWARE DEVELOPMENT SYSTEM

(71) Applicant: Bank of America Corporation, Charlotte, NC (US)

(72) Inventors: Gaurav Bansal, Hyderabad (IN); Imran Khan, Ghaziabad (IN); Ramkumar Pk, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 190 days.

(21) Appl. No.: 17/339,236

(22) Filed: Jun. 4, 2021

(65) Prior Publication Data

US 2022/0391181 A1 Dec. 8, 2022

(51) Int. Cl.
| | |
|---|---|
| *G06F 8/36* | (2018.01) |
| *G06F 9/54* | (2006.01) |
| *G06F 40/40* | (2020.01) |
| *G06F 40/186* | (2020.01) |
| *G06N 20/00* | (2019.01) |

(52) U.S. Cl.
CPC ............... *G06F 8/36* (2013.01); *G06F 9/541* (2013.01); *G06F 40/186* (2020.01); *G06F 40/40* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 2005/0097364 | A1 | 5/2005 | Edeki et al. |
| 2007/0067755 | A1 | 3/2007 | Hinchey et al. |
| 2007/0162410 | A1 | 7/2007 | Hinchey et al. |
| 2010/0228695 | A1 | 9/2010 | Kaplan |
| 2010/0229230 | A1 | 9/2010 | Edeki et al. |
| 2014/0032466 | A1 | 1/2014 | Kaplan |
| 2016/0078366 | A1 | 3/2016 | Kaplan |
| 2018/0336181 | A1 | 11/2018 | Fink et al. |
| 2018/0336185 | A1* | 11/2018 | Fink ..................... G06F 40/109 |
| 2018/0349105 | A1* | 12/2018 | Makkar ..................... G06F 8/33 |
| 2018/0349106 | A1 | 12/2018 | Makkar |
| 2019/0079741 | A1 | 3/2019 | Makkar |

(Continued)

FOREIGN PATENT DOCUMENTS

| | | |
|---|---|---|
| CN | 101010934 B | 9/2010 |
| EP | 2639792 A1 | 9/2013 |

(Continued)

*Primary Examiner* — Isaac Tuku Tecklu

(57) ABSTRACT

According to certain embodiments, a software development system comprises memory and a processor operably coupled to the memory. The memory is operable to store a plurality of code templates, each coded according to syntax of a respective programming language. The processor is configured to receive a user instruction in natural language and perform processing of the user instruction to yield a structured user instruction. The processor is further configured to determine a pre-defined structure that maps to the structured user instruction, select a code template associated with the pre-defined structure that maps to the structured user instruction, and use the selected code template to generate software code that implements functionality of the structured user instruction according to the syntax of the respective programming language of the selected code template.

17 Claims, 3 Drawing Sheets

(56) References Cited

U.S. PATENT DOCUMENTS

| | | |
|---|---|---|
| 2019/0079752 A1 | 3/2019 | Makkar |
| 2019/0079753 A1* | 3/2019 | Makkar ............... G06F 8/71 |
| 2019/0079754 A1* | 3/2019 | Makkar ............... G06F 8/73 |
| 2019/0114157 A1 | 4/2019 | Makkar et al. |
| 2019/0146965 A1 | 5/2019 | Zack |
| 2019/0164061 A1 | 5/2019 | Freed et al. |
| 2019/0303115 A1 | 10/2019 | Kelly et al. |
| 2019/0317743 A1* | 10/2019 | Cremeans ............ G06F 8/73 |
| 2019/0385134 A1 | 12/2019 | Keen et al. |
| 2020/0019561 A1 | 1/2020 | Doyle |
| 2020/0028925 A1 | 1/2020 | Monge Nunez et al. |
| 2020/0057612 A1* | 2/2020 | Doyle ................. G06F 8/35 |
| 2020/0057634 A1 | 2/2020 | Makkar |
| 2020/0082832 A1 | 3/2020 | Trim et al. |
| 2020/0089561 A1 | 3/2020 | Laing et al. |
| 2020/0097261 A1* | 3/2020 | Smith ................. G06N 3/04 |
| 2020/0117938 A1 | 4/2020 | Greenberger et al. |
| 2020/0133559 A1 | 4/2020 | Auvenshine et al. |
| 2020/0142672 A1 | 5/2020 | Makkar |
| 2020/0153921 A1 | 5/2020 | Kolluri Venkata et al. |
| 2020/0173809 A1 | 6/2020 | Turner et al. |
| 2020/0175456 A1 | 6/2020 | Dar Mousa et al. |
| 2020/0175891 A1 | 6/2020 | Lu et al. |
| 2020/0177527 A1 | 6/2020 | Liu et al. |
| 2020/0186605 A1 | 6/2020 | Rakshit et al. |
| 2020/0219489 A1 | 7/2020 | Stephenson et al. |
| 2020/0221191 A1 | 7/2020 | Baughman et al. |
| 2020/0241872 A1 | 7/2020 | Muddakkagari |
| 2020/0249919 A1 | 8/2020 | Makkar |
| 2020/0264870 A1 | 8/2020 | Makkar |
| 2020/0279023 A1 | 9/2020 | Starks et al. |
| 2020/0279180 A1 | 9/2020 | Yu et al. |
| 2020/0293293 A1 | 9/2020 | Makkar |
| 2020/0302332 A1 | 9/2020 | Contreras et al. |
| 2020/0319878 A1 | 10/2020 | Makkar |
| 2021/0011696 A1 | 1/2021 | Makkar et al. |
| 2021/0067477 A1 | 3/2021 | Tan et al. |
| 2021/0133654 A1 | 5/2021 | Denholm et al. |

FOREIGN PATENT DOCUMENTS

| | | |
|---|---|---|
| JP | 5247062 B2 | 7/2013 |
| KR | 101712296 B1 | 3/2017 |

* cited by examiner

SOFTWARE DEVELOPMENT SYSTEM

TECHNICAL FIELD

Certain embodiments of the present disclosure relate generally to a software development system.

BACKGROUND

Software development may generally refer to a process that includes writing code for a software component, such as a software product, program, application, feature, other software component, or a portion of thereof. In a broader sense, software development may include other steps involved in creating and managing software, such as researching, conceiving, specifying, designing, prototyping, programming, documenting, testing, modifying, updating, reusing, re-engineering, maintaining, bug-fixing, or any other activities that result in software. Software can be developed for a variety of purposes, such as to meet the needs of a user or a business.

SUMMARY

The software development system disclosed in the present application provides a technical solution to technical problems. For example, technical problems exist with the process of developing software code using traditional software development tools. Developing software code using traditional software tools can be complex and can rely heavily on a user to understand and implement complicated syntax requirements of one or more programming languages. Additionally, developing software code using traditional software development tools may require the user to understand a voluminous amount of code so that a portion of code under development fits cohesively within an overall code base. Developing code in this manner may be inefficient and may be sensitive to human error.

The software development system disclosed in the present application provides a technical solution to this and other problems associated with traditional software development tools. Certain embodiments leverage machine learning to extract attributes from a user instruction received in natural language. The disclosed software development system provides several practical applications and technical advantages which include a process for arranging the attributes into a structured format that can be mapped to a pre-defined structure. More specifically, this process allows the software development system to identify a code template associated with the pre-defined structure that maps to the structured user instruction, and to use the code template to generate software code that implements functionality of the structured user instruction according syntax of a programming language.

Thus, in contrast to existing techniques, the disclosed process is able to receive a user instruction in natural language and translate the user instruction to software code according to syntax of a programming language. This process provides a practical application by improving the software development system's ability to receive and apply natural language instructions, which may improve the speed and accuracy associated with developing software code. This practical application not only improves the software development system's ability to develop software code, but also improves the underlying network and the devices within the network. For example, the software development system may be less sensitive to human error, such as a syntax error, such that software code may be generated with greater accuracy. This may reduce the likelihood of the software code having an error, such as a syntax error, that would otherwise impact devices running the software code.

In certain embodiments, a software development system comprises memory and a processor. The memory is operable to store a plurality of code templates. Each code template comprises software code coded according to syntax of a respective programming language. The processor is operably coupled to a network interface and the memory. The processor is configured to receive a user instruction in natural language and perform processing of the user instruction received in natural language to yield a structured user instruction. The processing comprises identifying attributes in the user instruction and arranging the attributes according to a structured format. The processor is further configured to determine a pre-defined structure that maps to the structured user instruction. The pre-defined structure that maps to the structured user instruction is identified from a group of pre-defined structures, and the pre-defined structure that maps to the structured user instruction is identified based on at least one of the attributes of the structured user instruction. The processor is further configured to select a code template from the plurality of code templates. The selected code template is associated with the pre-defined structure that maps to the structured user instruction. The processor is further configured to use the selected code template to generate software code that implements functionality of the structured user instruction according to syntax of the respective programming language of the selected code template.

Certain embodiments of the present disclosure may include some, all, or none of these advantages. These advantages and other features will be more clearly understood from the following detailed description taken in conjunction with the accompanying drawings and claims.

BRIEF DESCRIPTION

For a more complete understanding of the present disclosure and for further features and advantages thereof, reference is now made to the following description taken in conjunction with the accompanying example drawings, in which.

DETAILED DESCRIPTION

The software development system disclosed in the present application provides a technical solution to technical problems associated with the process of developing software code using traditional software development tools. For example, certain embodiments of the software development system disclosed in the present application reduce the complexity associated with writing software code. In certain embodiments, the software development system allows the user to input instructions in natural language, rather than requiring the user to use programming language syntax. The software development system understands and acts upon the natural language instructions received from the user in order to generate software code that uses the syntax of the applicable programming language.

Figure 1:
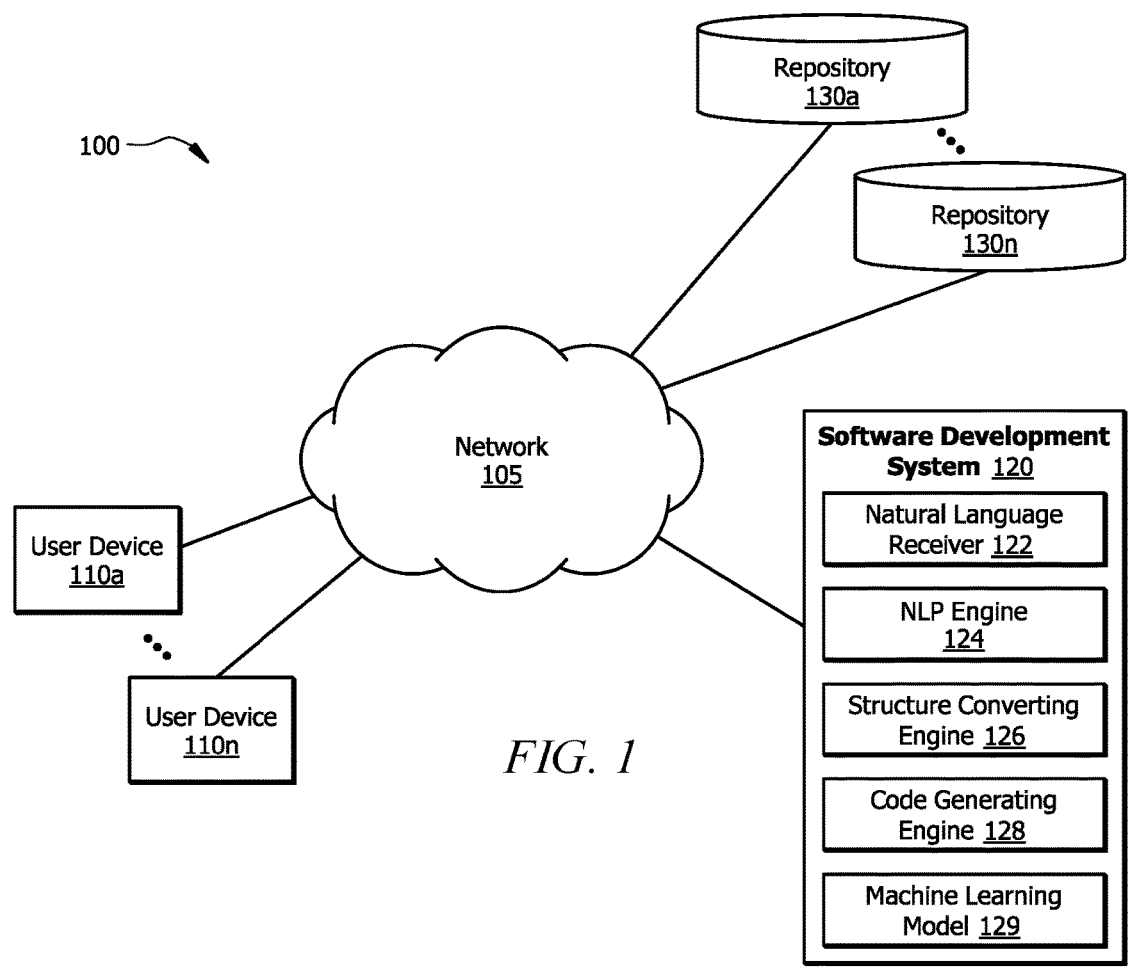
FIG. 1 illustrates an example of a system, in accordance with certain embodiments.

Certain embodiments of the above-discussed features may be implemented in accordance with one or more of FIGS. 1-5, like numerals used to describe like components of the various figures. FIG. 1 illustrates an example of a system 100 configured to generate software code, in accordance with certain embodiments. According to certain embodiments, system 100 comprises network 105, one or more user devices 110a-n, a software development system 120, and one or more repositories 130a-n. In general, a user interacts with user device 110 in order to provide input to and receive output from software development system 120. In certain embodiments, the input comprises a natural language instruction and the output comprises software code that implements functionality indicated by the natural language instruction according to the syntax of a programming language.

Network 105 facilitates communication between components of system 100. For example, network 105 may comprise any suitable network(s) operable to facilitate communication among user device 110, software development system 120, and/or repository 130. Network 105 may include any interconnecting system capable of transmitting audio, video, signals, data, messages, or any combination of the preceding. Network 105 may include all or a portion of a public switched telephone network (PSTN), a cellular network, a base station, a gateway, a public or private data network, a local area network (LAN), a metropolitan area network (MAN), a wide area network (WAN), a wireless WAN (WWAN), a local, regional, or global communication or computer network, such as the Internet, a wireline or wireless network, an enterprise intranet, or any other suitable communication link, including combinations thereof, operable to facilitate communication between the components.

User device 110 is a non-limiting term that generally refers to equipment that a user, such as a software developer, employs in order to interact with software development system 120 via network 105. For example, the user may interact with user device 110 in order to provide input comprising one or more natural language instructions and to receive output comprising software code. Examples of user device 110 include a workstation, a personal computer, a laptop, a tablet computer, a smartphone, a handheld device, a wireless device, etc. User device may include one or more interfaces (such as interface 502 described with respect to FIG. 5) in order to obtain input from the user and/or provide output to the user. Examples of interfaces include a display (e.g., monitor, screen, touchscreen, graphical user interface), a visual interfaces (e.g., camera), audio interfaces (e.g., speaker and/or microphone), keyboard, mouse, etc.

Software development system 120 generally refers to a system that receives a natural language instruction and generates software code that implements functionality indicated by the natural language instruction. In certain embodiments, software development system 120 may comprise a server, a cloud-based system, or other suitable system. In certain embodiments, software development system 120 may be associated with an institution (e.g., software development system 120 may be within an enterprise network of the institution or hosted by a cloud service provider on behalf of the institution). As described above, software development system 120 may be configured to communicate with one or more user devices 110a-n and/or one or more repositories 130a-n via network 105.

In certain embodiments, software development system 120 comprises a natural language receiver 122, an NLP engine 124, a structure converting engine 126, and a code generating engine 128. Natural language receiver 122 receives a natural language instruction provided by a user. For example, natural language receiver 122 may receive the natural language instruction from the user's user device 110 via network 105. As an example, the natural language instruction may be a speech instruction (e.g., real-time voice input) that the user speaks into a microphone of user device 110. As another example, the natural language instruction may be a text instruction that the user types into user device 110 (e.g., using a keyboard, touchscreen, etc.) or selects from a menu of natural language options displayed by user device 110 (e.g., using a mouse, touchscreen, etc.). In certain embodiments, the user may specify the natural language instruction in a Business Requirements Document (BRD) and may provide the BRD as an input to the NLP engine 124.

NLP engine 124 performs natural language processing (NLP) of the natural language instruction. NLP engine 124 may process the natural language instruction based on one or more rules in order to yield a refined instruction. The refined instruction may comprise speech or text. For example, if software development system 120 received the natural language instruction in speech form, NLP engine 124 may output the refined instruction in speech form. Speech-to-text conversion may be performed later, such as during processing performed by structure converting engine 126. Alternatively, in certain embodiments, NLP engine 124 may receive the natural language instruction in speech form, perform speech-to-text conversion, and output the refined instruction in text form. For the case where NLP engine 124 receives the natural language instruction in text form (such as in a BRD), NLP engine 124 may output the refined instruction in text form. In certain embodiments, the one or more rules applied by NLP engine 124 include one or more rules to identify information relevant to generating the software code and remove noise in order to yield the refined instruction.

In certain embodiments, the one or more rules applied by NPL engine 124 may be retrieved from a repository 130. In certain embodiments, the one or more rules may be updated by machine learning (ML). An ML model may analyze numerous speech instructions over time and may learn to recognize certain language as noise. As an example, the ML model may learn to recognize background noise in a voice/speech instruction as noise. As another example, the ML model may learn to recognize certain fillers (e.g., "uh," "um," sighs, etc.) as noise. As another example, the ML model may learn to recognize certain words or phrases that are likely to be part of everyday speech (as opposed to part of a specific user instruction) as noise. Suppose the user's instruction in natural language said "I want to add a button named ABC to page 1" or "please add a button on page 1 and name it ABC," the ML model may learn to treat phrases like "I want to" and "please" in this context as noise. Thus, the refined speech version of each of these example user instructions may include "add button," "name ABC," and "page 1," without including the words and phrases that correspond to noise. The ML may then update the one or more rules to identify words, phrases, sounds, etc. that correspond to noise so that similar noise can be removed from subsequent instructions.

In certain embodiments, NLP engine 124 provides the refined instruction to structure converting engine 126. Structure converting engine 126 is configured to convert the refined instruction to a structured user instruction. The structured user instruction arranges attributes of the refined instruction according to a structured format, such as a JavaScript Object Notation (JSON) structure. In certain embodiments, structure converting engine 126 analyzes the refined instruction to identify one or more attributes included in the refined instruction. Structure converting engine 126 then organizes the identified one or more attributes into the structured format. Examples of attributes include functions (such as "add button") and/or parameters (such as "name ABC" or "page 1").

In certain embodiments, structure converting engine 126 determines whether the refined instruction contains all of the attributes that the structured format requires. If structure converting engine 126 determines that the refined instruction is incomplete (e.g., the refined instruction does not include each attribute of the structured format), structure converting engine 126 may initiate a request to obtain the missing attribute from the user. As an example, suppose the refined instruction corresponds to a structured format that requires a first parameter and a second parameter as inputs. If structure converting engine 126 determines that the refined instruction only includes the first parameter, then structure converting engine 126 can initiate a request to obtain the second parameter from the user. Once structure converting engine 126 receives the second parameter, structure converting engine 126 can include the second parameter in the structured user instruction.

Structure converting engine 126 may provide the structured user instruction to code generating engine 128. Code generating engine 128 generates software code to implement the user's instruction according to the syntax of a programming language. In certain embodiments, software development system 120 may comprise a machine learning (ML) model 129. For example, in certain embodiments, ML model 129 may be integrated in software development system 120 as an Enterprise tool via one or more Application Programming Interfaces (APIs) or taken action. ML model 129 may be trained in order to adapt to various instructions and/or various ways that a user may formulate an instruction.

As an example, suppose code generating model 128 supports an aggregation function. ML model 129 may include a rule to implement the aggregation function when the user's instruction includes the term "aggregate." Over time, ML model 129 may determine that the user uses one or more other terms, such as "join" or "combine," to refer to the aggregation function. In response, ML model 129 may update the rule in order to implement the aggregation function when the user's instruction includes any one of the terms "aggregate," "join," or "combine." More generally, ML model 129 may map the user's instructions (which ML model 129 may receive in a structured format that has been converted from a natural language speech input or text input of the user) to one or more code templates. Over a period of time, ML model 129 learns to handle different types of instructions, for example, as per the requirements of the user/business developing the software. In this manner, code generating engine 128 comprising ML model 129 may learn to generate software code that matches natural language instructions received from the user.

In certain embodiments, software development system 120 supports generating software code in more than one programming language. Thus, to generate the software code, code generating engine 128 may determine which programming language to use. Code generating engine 128 may determine the programming language in any suitable manner, such as based on a selection from the user (e.g., a selection included as part of a speech or text instruction from the user, or a selection received separately from the instruction), based on the programming language already being used for other features of the software program, or based on other suitable criteria. Certain embodiments may select to generate the software code in more than one programming language. Generating the software code in more than one programming language may allow a user to compare different options and select a preferred option. In addition, or in the alternative, generating the software code in more than one programming language may provide an efficient way of implementing the user's instructions across a suite of products. For example, the user may be able to provide a single instruction that facilitates adding the same functionality to a first application that uses a first programming language and to a second application that uses a second programming language.

In certain embodiments, repositories 130*a-n* store information that may be used to facilitate functionality of software development system 120. As an example, a repository 130 may store one or more rules that software development system 120 uses in understanding a natural language instruction or in generating software code. As another example, a repository 130 may store software code, such as existing code that can be augmented or modified by software development system 120, code snippets that software development system 120 can use in generating new code, and/or new code generated by software development system 120.

For purposes of example and explanation, FIG. 1 depicts system 100 as including certain components. However, this disclosure recognizes that system 100 may include any suitable components. One of ordinary skill in the art will appreciate that certain components can be omitted and other components not mentioned herein can be added. Additionally, components can be integrated or separated in any suitable manner. Similarly, functionality can be distributed or localized in any suitable manner. As one example, although FIG. 1 illustrates an embodiment where user device 110 communicates with software development system 120 via network 105, in other embodiments all or a portion of software development system 120 may be implemented as a computer program that can be installed and executed on user device 110 itself.

Figure 2:
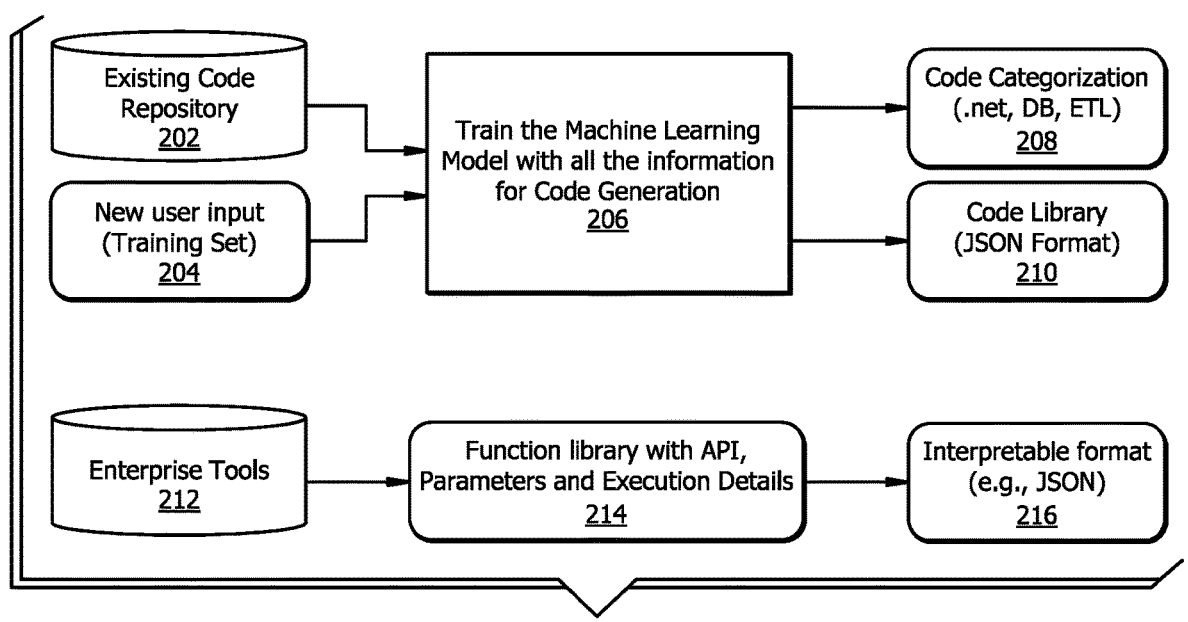
FIG. 2 illustrates an example of a flow diagram for preparing a machine learning model, in accordance with certain embodiments.

FIG. 2 illustrates an example of a flow diagram for preparing a machine learning model, in accordance with certain embodiments. In certain embodiments the flow includes providing data from an existing code repository 202 and new user input (training set) 204 as inputs to a machine learning model 206. The machine learning model 206 trains to perform code generation based on the inputs. The machine learning model 206 provides output to code categorization 208 and/or code library 210 based on the training. The code categorization 208 and/or code library 210 may be used to facilitate understanding and implementing subsequent instructions from a user. In certain embodiments, code categorization 208 may comprise a .net, database (e.g., .db), or event trace log (e.g., .etl) format. In certain embodiments, code library 210 may comprise a JSON format.

FIG. 2 further illustrates that, in certain embodiments, enterprise tools 212 may provide input to a function library 212. Function library 214 may determine functions based on the input. For example, the functions may comprise parameters and/or execution details. Function library 212 may provide the functions to interpretable format 216, for example, in order to organize the parameters and/or execution details into a structured format (e.g., JSON) that can be interpreted in order to generate software code.

Figure 3:
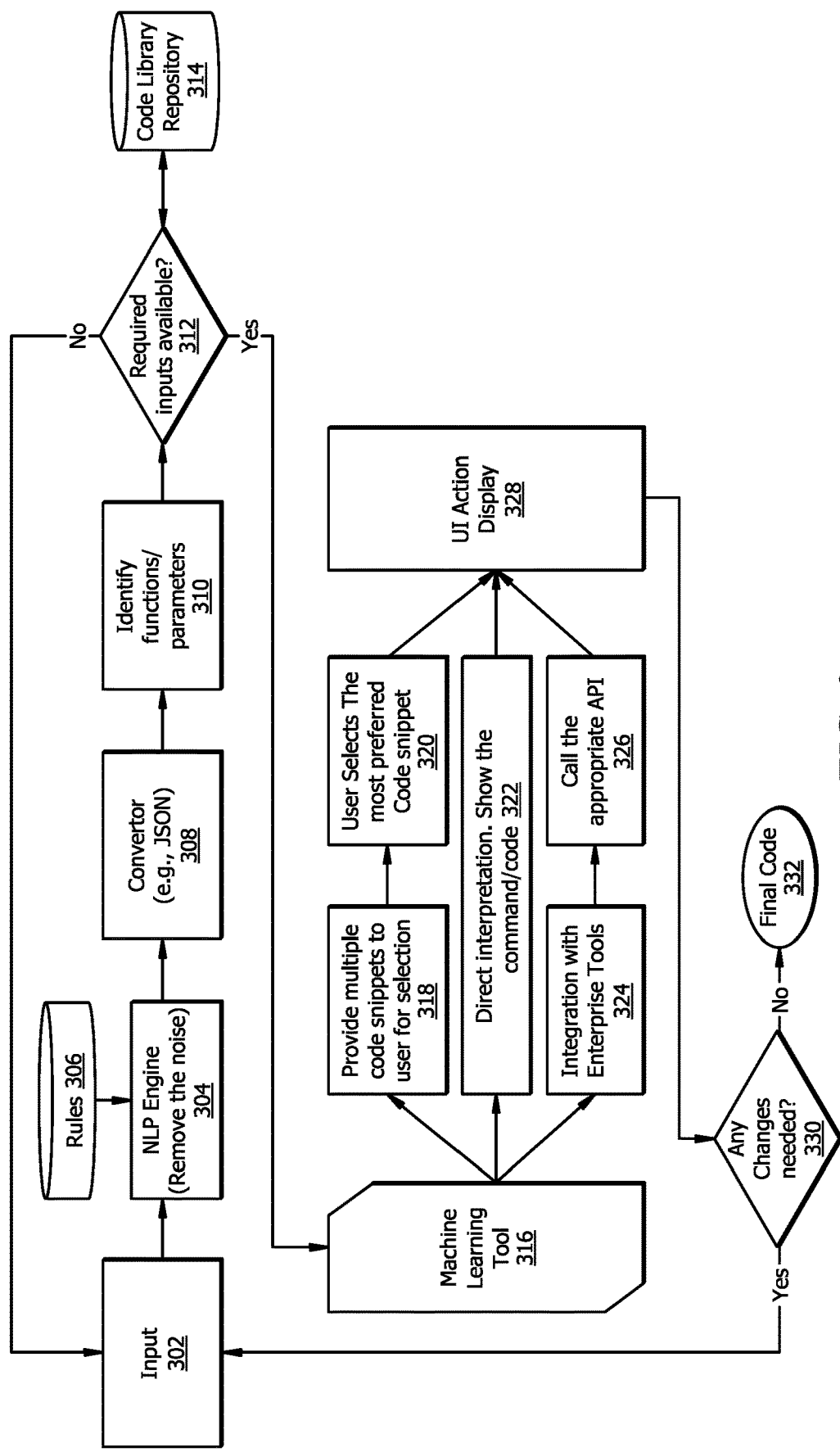
FIG. 3 illustrates an example of a flow diagram for executing a machine learning model, in accordance with certain embodiments.

FIG. 3 illustrates an example of a flow diagram for executing a machine learning model, in accordance with certain embodiments. The flow begins with obtaining input from a user (block 302). The input comprises a natural language instruction. The natural language may be obtained in voice/speech form or in text form (such as in a BRD provided by the user). As an example, the natural language instruction may be "I want to aggregate table 1 and table 2." The flow continues to block 304 with natural language processing. For example, an NLP engine 124 removes noise from the natural language instruction based on one or more rules obtained from a repository, as shown in block 306. In certain embodiments, the rules can include custom rules developed using ML. The NLP processing yields a refined instruction. Continuing with the example, the refined instruction may comprise "aggregate," "table 1," and "table 2." That is, to generate the refined instruction, NLP engine 124 may omit the phrase "I want to" from the natural language instruction in response to determining that the phrase is extraneous/noise.

After processing the instruction to yield a refined instruction, the flow continues to block 308 where the refined instruction may be processed by a converter. As an example, structure converting engine 126 may convert the refined instruction to a structured user instruction. The structured user instruction arranges attributes of the user instruction according to a structured format, such as JSON. Continuing with the example, structure converting engine 126 may organize the terms "aggregate," "table 1," and "table 2" according to a format that facilitates further processing.

The flow continues to block 310 to identify functions (such as an aggregation function) and/or parameters (such as "table 1" and "table 2") included in the structured user instruction. The flow then continues to block 312 to determine if software development system has received all required attributes. The required attributes may comprise functions and/or parameters required to generate software code that implements the user's instruction. To determine the required attributes for a particular user instruction, certain embodiments perform crosschecking to match a name used in the structured user instruction to names of pre-defined structures stored in a database, such as a code library repository or other repository 130. In certain embodiments, examples of pre-defined structures may include one or more structures for which the required attributes are known to software development system 120, for example, based on previous machine learning. For example, the pre-defined structures may be prepared at least in part based on ML and stored in a code library repository, as described with respect to FIG. 2.

Continuing with the example, software development system 120 may match the term "aggregate" from the user's instructions with a pre-defined structure for an "aggregation" function identified in the repository. In response to identifying a matching pre-defined structure, software development system 120 may determine the requirements for the user instruction based on requirements of the matching pre-defined structure.

For purposes of example, suppose the following describes the pre-defined structure for the aggregation function:
{Function name: "Aggregation",
Pre condition: "ALL_BELOW_REQUIRED",
Source Table Names: TABLE_X, TABLE_Y,
Destination Table Name: TARGET_TABLE
Group By: COLUMN1, COLUMN2};

Software development system 120 may determine that the user provided the "Source Table Names" (e.g., "table 1" in the user's instruction corresponds to the required parameter "TABLE_X" in the aggregation function, and "table 2" in the user's instructions corresponds to the required parameter "TABLE_Y" in the aggregation function). Software development system 120 may determine that the user still needs to provide other required attributes of the aggregation function, such as the "Destination Table Name" and the "Group By" parameters.

If any required attributes are missing, the flow may return to block 302 in order to obtain the attributes. For example, software development system 120 may request the user to provide the required attribute. The request may be in the form of an audio request (e.g., via a speaker of user device 110) or a visual request (e.g., via a display of user device 110). In certain embodiments, the user may provide initial input (first pass through block 302) in BRD form and may provide additional input (second or later pass through block 302) via speech in order to supplement the initial input (if the initial input is missing required attributes).

Once the software development system 120 has obtained each of the attributes required to implement the user instruction, the flow continues to block 316 to execute the machine learning model. For example, the machine learning model receives the structured user instruction and facilitates generating software code that implements the user's instruction in a programming language. In certain embodiments, generating software code may comprises obtaining a code template and populating attributes of the code template with corresponding attributes from the structured user instruction. Continuing with the example discussed above, generating software code may comprise obtaining a code template that comprises programming language for performing an aggregation function and populating the code template to aggregate table 1 and table 2 in the manner indicated by the other attributes (destination table name, group by) of the structured user instruction.

Generating software code may be performed in any suitable manner. In some embodiments, the machine learning model provides multiple code snippets to the user for selection (block 318) and the user selects the most preferred code snippet (block 320). For example, the machine learning model may provide a first snippet that implements the user's instruction in a first programming language, a second snippet that implements the user's instruction in a second programming language, and so on. The user may select the snippet corresponding to a preferred programming language (e.g., depending on the programming language best suited to implement the overall functionality that the user wants to implement, depending on the programming language used for other portions of a software program, etc.). In some embodiments, the machine learning model directly interprets the user's instruction and shows the resulting command or code (block 322). In some embodiments, the machine learning model integrates with enterprise tools (block 324) and calls an appropriate API (block 326).

In certain embodiments, the machine learning model supports multiple options for generating the software code (e.g., the option of blocks 318-320, the option of block 322, and/or the option of blocks 324-326) and determines which option(s) to follow, for example, based on details of the user's instruction. Each option may lead to block 328, which communicates a non-final version of the generated software code to the user. For example, the non-final version may be displayed to the user via a user interface of user device 110. Certain embodiments display a user confirmation request with the non-final version of the generated software code to confirm whether the user approves.

The flow proceeds to block 330 to determine whether any changes are needed. In certain embodiments, the user provides input indicating that changes are needed, and the flow may return to block 302 to receive the user's input and generate updated software code accordingly. In certain embodiments, if no changes are needed, the flow proceeds to block 332 with finalizing the software code. The final software code may then be used in any suitable manner. For example, the final software code may be displayed to a user (e.g., so the user can refer to the final software code when developing further software code that interacts with or relies on functionality of the final software code), stored in a repository, compiled, executed in a software application, etc.

Certain embodiments continue to train the ML as software development system 120 continues to receive new user instructions. For example, if the user's instruction does not fully match a pre-defined structure in the code library, the user can provide code and thread the code back to the code library so that the software development system 120 can process similar user instructions in the future. Thus, ML can be used to help the user select a solution based on learning from prior instructions from the user and/or other users.

Figure 4:
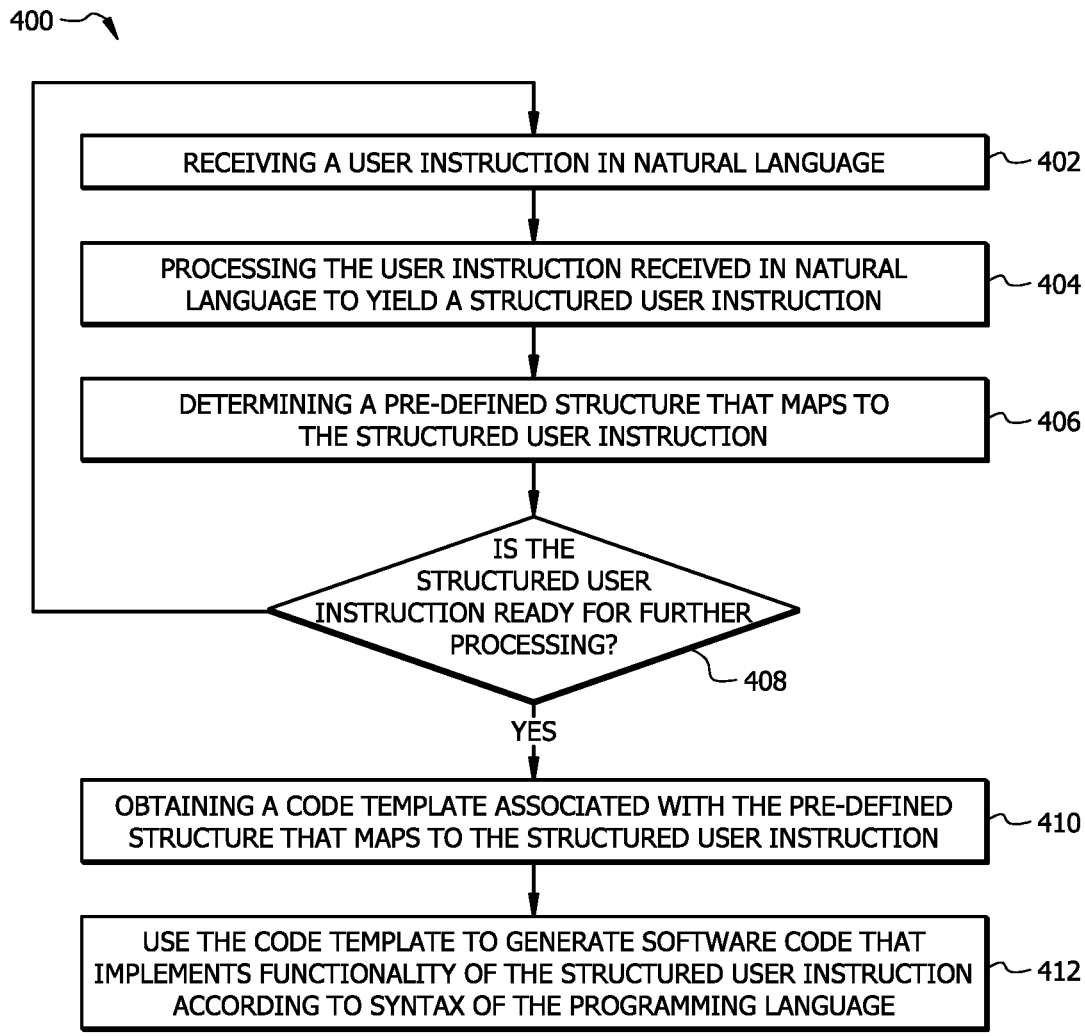
FIG. 4 illustrates an example of a method, in accordance with certain embodiments.

FIG. 4 illustrates an example of a method 400, in accordance with certain embodiments. In certain embodiments, the method may be performed by a software development system, such as software development system 120 described with respect to FIG. 1. In certain embodiments, the method may be performed by processing circuitry configured to execute logic, such as processing circuitry 504 described with respect to FIG. 5.

The method begins at step 402 with receiving a user instruction in natural language. As described above, the user instruction may be received in speech form or text form. An example of speech includes real-time voice input that the user speaks into a microphone of user device 110. An example of text includes text that the user types into user device 110 (e.g., using a keyboard, touchscreen, etc.), selects from a menu of natural language options displayed by user device 110 (e.g., using a mouse, touchscreen, etc.), or submits as a BRD. For purposes of example, suppose the user instruction in natural language says "I would like to modify position X of the graphical user interface by placing a button there."

The method proceeds to step 404 with processing the user instruction received in step 402 to yield a structured user instruction. Certain embodiments process the user instruction in real-time. Step 404 may comprise any suitable sub-steps to facilitate converting the user instruction from natural language format to structured format. In certain embodiments, processing the user instruction in step 404 comprises applying one or more natural language processing rules configured to identify and remove noise from the natural language version of the user instruction. Continuing with the example, removing noise from the phrase "I would like to modify position X of the graphical user interface by placing a button there" may result in the refined instruction "position X" and "placing button." In certain embodiments, processing the user instruction in step 404 comprises performing speech-to-text conversion (e.g., if the user instruction in natural language received in step 402 comprises speech). In certain embodiments, processing the user instruction in step 404 comprises identifying attributes (e.g., one or more functions and/or one or more parameters) in the user instruction and arranging the attributes according to a structured format, such as a JSON format. Continuing with the example, the method may interpret the phrase "position X" as a location parameter and the phrase "placing button" as corresponding to an "add button" function. The method may determine that the structured format places the function name before the parameter name and may therefore yield the structured user instruction "add button; position X."

The method proceeds to step 406 with determining a pre-defined structure that maps to the structured user instruction that was obtained in step 404. For example, step 406 may identify the pre-defined structure that maps to the structured user instruction from a group of pre-defined structures (e.g., candidate structures). A pre-defined structure may comprise a structure associated with a known set of attributes (e.g., based on prior ML training). Identifying the pre-defined structure that maps to the structured user instruction may comprise comparing one or more attributes of the structured user instruction (such as the "add button" attribute) to determine which pre-defined structure in the group of pre-determined structures comprises a corresponding one or more attributes. Thus, in the example, if the group of pre-defined structures included a first pre-defined structure for "aggregate table entries" and a second pre-defined structure for "add button," the method would identify the second pre-defined structure as mapping to the structured user instruction. In this manner, the pre-defined structure that maps to the structured user instruction is identified based on at least one of the attributes of the structured user instruction.

In certain embodiments, the method proceeds to step 408 in order to determine whether the structured user instruction is ready for further processing. For example, the pre-defined structure determined in step 406 may indicate a plurality of required attributes. Step 408 may include determining whether the structured user instruction includes each of the required attributes. In response to determining that the structured user instruction has one or more missing attributes (required attributes of the pre-defined structure that are missing from the structured user instruction), the method may request the one or more missing attributes from a user, receive the one or more missing attributes from the user (e.g., the user may provide the missing attribute(s) in natural language form, analogous to step 402), and update the structured user instruction to include the one or more missing attributes received from the user (e.g., optionally, the method may process the missing attribute(s) in a manner analogous to step 404 and then add the attribute(s) to the structured user instruction such that the format of the structured user instruction corresponds to that of the pre-defined structure). As an example, suppose the pre-defined structure for the "add button" function includes required attributes comprising "position" (where to place the button), "name" (what to label the button), and "action" (what happens when the button is clicked). The method may determine that the initial input received in step 402 is missing the "name" and "action" attributes, and may request the user to provide those attributes. Once the structured user instruction is ready for further processing, the method may proceed to step 410.

At step 410, the method obtains a code template associated with the pre-defined structure that maps to the structured user instruction (the pre-determined structure identified in step 406). In certain embodiments, the code template comprises software code that uses the syntax of a programming language and placeholders to be filled in based on the user's instructions. At step 412, the method uses the code template to generate software code that implements functionality of the structured user instruction according to syntax of the programming language. As an example, the method may copy the software code from the code template and may populate the placeholders based on the corresponding attributes of the structured user instruction.

In certain embodiments, the method provides the software code generated in step 410 to the user so that the user can determine whether any changes are needed. If changes are needed, the user may provide a new user instruction describing the change (e.g., the method may return to step 402 to receive the new user instruction and may then proceed with processing the new user instruction in order to generate revised code). In certain embodiments, if no changes are needed, the method finalizes the software code. The final software code may then be used in any suitable manner. For example, the final software code may be displayed to a user (e.g., so the user can refer to the final software code when developing further software code that interacts with or relies on functionality of the final software code), stored in a repository, compiled, executed in a software application, etc.

The method of FIG. 4 may include any other suitable steps. As an example, in certain embodiments, the pre-defined structure that maps to the structured user instruction is associated with a plurality of code templates. This could occur for various reasons. For example, certain functions, such as "add button" could be associated with a number of different "add button" code templates, each template designed to add a different type of button. The different buttons could have different visual appearance (different size, shape, color, etc.), different functionality (such as a single-click button vs. a double-click button), different programming language, and/or other differences. In certain embodiments, ML may be used to select/recommend one or more of the available code templates (e.g., based on analyzing the attributes of the structured user instruction). The method may obtain user feedback (e.g., ask the user to select one or more of the code templates recommended by ML, or generate the software code based on the one or more code templates recommended by ML and ask the user to select the user's preferred software code snippet(s)).

In certain embodiments, the pre-defined structure that maps to the structured user instruction is associated with a plurality of code templates, each code template comprising a different programming language. The code template used to generate the software code (e.g., in step 412) is selected based at least in part on its programming language. For example, the user could select a preferred programming language or ML could recommend a programming language. The programming language may be selected/recommended for any suitable reasons, such as user preference, relative capabilities/constraints of the programming language compared to the other programming languages (e.g., one programming language may be better suited to implementing certain functionality than another programming language), software program/product that will use the software code (e.g., a programming language already being used for other features of the software program could be used to implement the functionality of the user instruction), etc.

Certain embodiments generate software code in more than one programming language. For example, in certain embodiments, the method of FIG. 4 further comprises obtaining a second code template associated with the pre-defined structure that maps to the structured user instruction (the second code template comprises a second programming language) and using the second code template to generate second software code that implements the functionality of the structured user instruction according to syntax of the second programming language. As noted above, generating the software code in more than one programming language may allow a user to compare different options and select a preferred option. In addition, or in the alternative, generating the software code in more than one programming language may provide an efficient way of implementing the user's instructions across a suite of products. For example, the user may be able to provide a single instruction that facilitates adding the same functionality to a first application that uses a first programming language and to a second application that uses a second programming language.

In certain embodiments, the method may receive a user instruction in native language that software development system 120 is unable to interpret. This can happen when the user instruction not sufficiently similar to anything that software development system 120 has seen before, such as when the user instruction requests a new type of functionality for which a code template does not exist or when the user instruction uses terminology that is unfamiliar to software development system 120. In this case, the user can provide further information (e.g., the user can provide a new code template, the user can provide further information to facilitate parsing unfamiliar terminology, etc.). The further information can be used by software development system 120 to train an ML model so that software development system 120 is prepared to handle similar requests in the future.

As an example, in certain embodiments, the method of FIG. 4 may further comprise receiving a second user instruction in natural language (similar to step 402) and processing the second user instruction to yield a second structured user instruction (similar to step 404). The method may further comprise determining that the second structured user instruction does not map to any pre-defined structure in the group of pre-defined structures. For example, the method may compare attributes of the second structured user instruction to attributes of the pre-defined structures and determine that there is not a good match. In response to determining that the second structured user instruction does not map to any pre-defined structure in the group of pre-defined structures, the method comprises using the second structured user instruction to train an ML model. For example, the user may provide information that facilitates training the ML model to map instructions similar to the second structured user instruction to an existing pre-defined structure (e.g., based on clarifying terminology in the second user instruction) or to a new pre-defined structure associated with one or more new code templates (e.g., if the second user instruction requested a new type of functionality for which software development system 120 did not have an existing code template).

In certain embodiments, one or more steps of method 400 may be performed by an enterprise tool application programming interface (API) configured to receive the user instruction in natural language as an input (e.g., at step 402) and to provide the generated software code as an output (e.g., after completing the step of generating the software code in step 412).

Figure 5:
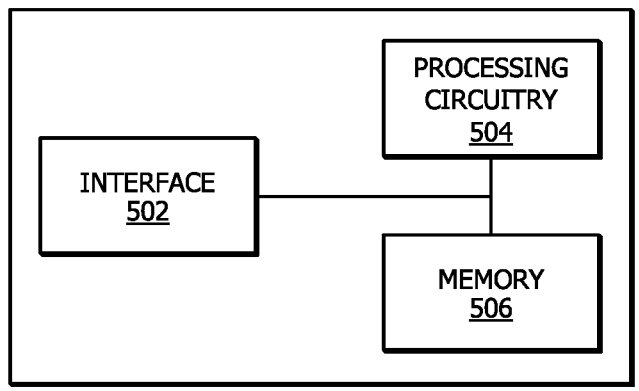
FIG. 5 illustrates an example of components of a computing system or computing device, in accordance with certain embodiments.

FIG. 5 illustrates an example of components of a computing system or computing device. For example, one or more components of FIG. 5 may be used to implement all or a portion of network 105, user device 110, software development system 120, and/or repository 130 described above. The components may comprise any suitable hardware and/or software configured to perform the functionality described above. The components may be implemented using shared hardware or separate hardware. In certain embodiments, components may be distributed in a cloud network environment.

In certain embodiments, the components comprise one or more interface(s) 502, processing circuitry 504, and/or memory(ies) 506. In general, interface 502 receives facilitates communication between components of a computing system or computing device. For example, interface 502 receives input, sends output, and/or preforms other suitable functionality. An interface 502 may comprise hardware and/or software. In general, processing circuitry 504 processes information. For example, processing circuitry 504 may execute logic configured to process information received from interface 502 and/or memory 506. Memory 506 stores, either permanently or temporarily, data, instructions, logic, or other information, such as information received from interface 502 or processed by processing circuitry 504.

Examples of interfaces 502 include user interfaces, network interfaces, and internal interfaces. Examples of user interfaces include one or more graphical user interfaces (GUIs), displays, buttons, printers, microphones, speakers, cameras, scanners, credit card readers, check readers, and so on. Network interfaces receive information from or transmit information through a network, perform processing of information, communicate with other devices, or any combination of the preceding. Network interfaces may comprise any port or connection, real or virtual, wired or wireless, including any suitable hardware and/or software, including protocol conversion and data processing capabilities, to communicate through a LAN, WAN, or other communication system that allows processing circuitry 504 to exchange information with or through a network. Internal interfaces receive and transmit information among internal components of a structure.

Processing circuitry 504 communicatively couples to interface(s) 502 and memory 506, and includes any hardware and/or software that operates to control and process information. Processing circuitry 504 may include a programmable logic device, a microcontroller, a microprocessor, any suitable processing device, or any suitable combination of the preceding. Processing circuitry 504 may execute logic stored in memory 506. The logic is configured to perform functionality described herein. In certain embodiments, the logic is configured to perform the methods described with respect to any of FIGS. 2-4.

Memory 506 includes any one or a combination of volatile or non-volatile local or remote devices suitable for storing information. For example, memory comprises any suitable non-transitory computer readable medium, such as Read Only Memory ("ROM"), Random Access Memory ("RAM"), magnetic storage devices, optical storage devices, or any other suitable information storage device or a combination of these devices. Memory 506 may be local/integrated with the hardware used by processing circuitry 504 and/or remote/external to the hardware used by processing circuitry 504.

Embodiments of the present disclosure may provide certain advantages. As an example, certain embodiments may facilitate efficient development of software code. For example, in certain embodiments, a software development system is configured to receive instructions from a user in natural language and to generate software code that implements the instructions according to a syntax of a programming language. Because the software development system does not depend on the user to provide instructions in the syntax of the programming language, the speed and accuracy associated with developing software code may be improved.

As another example, an advantage of certain embodiments includes integrating voice commands in a software development system, such as an Enterprise tool API. The voice commands facilitate directly making changes to the software code via the software development system, for example, using JSON function mapping. Certain embodiments that integrate voice commands provide functionality beyond speech-to-text features that simply convert speech to text without the ability to develop an integrated enterprise end-to-end software suite. As an example, in certain embodiments, the software development system may receive input from the user in speech form, remove noise from the user's speech to yield refined speech, and convert the refined speech to text. The software development system may then analyze the text to determine instructions of the user indicated by the text in order to implement the instructions in software code.

Certain embodiments of the present disclosure may include some, all, or none of these advantages. These advantages and other features will be more clearly understood from the following detailed description taken in conjunction with the accompanying drawings and claims.

The scope of this disclosure is not limited to the example embodiments described or illustrated herein. The scope of this disclosure encompasses all changes, substitutions, variations, alterations, and modifications to the example embodiments described or illustrated herein that a person having ordinary skill in the art would comprehend.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

Although several embodiments have been illustrated and described in detail, it will be recognized that substitutions and alterations are possible without departing from the spirit and scope of the present disclosure, as defined by the appended claims.

The invention claimed is:

1. A software development system, comprising:
a memory operable to store a plurality of code templates, each code template comprising software code coded according to syntax of a respective programming language; and
a processor operably coupled to a network interface and the memory, and configured to:
receive a user instruction in natural language;
apply one or more natural language processing rules to identify and remove noise from the user instruction in natural language to yield a refined instruction, wherein the removed noise comprises a phrase within the user instruction in natural language;
perform processing of the refined instruction to yield a structured user instruction, wherein the processing comprises identifying attributes in the refined instruction and arranging the attributes according to a structured format;
determine a pre-defined structure that maps to the structured user instruction, the pre-defined structure that maps to the structured user instruction identified from a group of pre-defined structures, the pre-defined structure that maps to the structured user instruction identified based on at least one of the attributes of the structured user instruction;
select a code template from the plurality of code templates, the selected code template associated with the pre-defined structure that maps to the structured user instruction; and
use the selected code template to generate software code that implements functionality of the structured user instruction according to the syntax of the respective programming language of the selected code template.

2. The software development system of claim 1, wherein the pre-defined structure that maps to the structured user instruction is associated with both the selected code template and at least one other code template of the plurality of code templates, the at least one other code template comprising a different programming language than the selected code template, and wherein the processor is configured to select the selected code template based at least in part on its programming language.

3. The software development system of claim 1, the processor further configured to:
select a second code template from the plurality of code templates, the second code template associated with the pre-defined structure that maps to the structured user instruction; and
use the second code template to generate second software code that implements the functionality of the structured user instruction according to syntax of a second programming language.

4. The software development system of claim 1, wherein the pre-defined structure that maps to the structured user instruction indicates a plurality of required attributes of the structured user instruction, and wherein the processor is further configured to:
determine one or more missing attributes of the structured user instruction, the one or more missing attributes comprising required attributes of the pre-defined structure that are missing from the structured user instruction;
request the one or more missing attributes from a user;
receive the one or more missing attributes from the user; and
update the structured user instruction to include the one or more missing attributes received from the user.

5. The software development system of claim 1, wherein the software is further configured to:
receive a second user instruction in natural language;
perform processing of the second user instruction to yield a second structured user instruction;
determine that the second structured user instruction does not map to any pre-defined structure in the group of pre-defined structures; and
in response to determining that the second structured user instruction does not map to any pre-defined structure in the group of pre-defined structures, use the second structured user instruction to train a machine learning model.

6. The software development system of claim 1, wherein at least a portion of the user instruction in natural language is received in speech form and to process the user instruction, the processor is further configured to perform speech-to-text conversion.

7. The software development system of claim 1, wherein at least a portion of the user instruction is received in text form.

8. The software development system of claim 1, wherein the software development system comprises an enterprise tool application programming interface (API) configured to receive the user instruction in natural language as an input and to provide the generated software code as an output.

9. A method comprising:
receiving a user instruction in natural language;
applying one or more natural language processing rules to identify and remove noise from the user instruction in natural language to yield a refined instruction, wherein the removed noise comprises a phrase within the user instruction in natural language;
processing the refined instruction to yield a structured user instruction, wherein the processing comprises identifying attributes in the refined instruction and arranging the attributes according to a structured format;
determining a pre-defined structure that maps to the structured user instruction, the pre-defined structure that maps to the structured user instruction identified from a group of pre-defined structures, the pre-defined structure that maps to the structured user instruction identified based on at least one of the attributes of the structured user instruction;
obtaining a code template associated with the pre-defined structure that maps to the structured user instruction; and
using the code template to generate software code that implements functionality of the structured user instruction according to syntax of a programming language.

10. The method of claim 9, wherein the pre-defined structure that maps to the structured user instruction is associated with a plurality of code templates, each code template comprising a different programming language, and wherein the method further comprises selecting the code template used to generate the software code based at least in part on its programming language.

11. The method of claim 9, the method further comprising:
   obtaining a second code template associated with the pre-defined structure that maps to the structured user instruction; and
   using the second code template to generate second software code that implements the functionality of the structured user instruction according to syntax of a second programming language.

12. The method of claim 9, wherein the pre-defined structure that maps to the structured user instruction indicates a plurality of required attributes of the structured user instruction, and wherein the method further comprises:
   determining one or more missing attributes of the structured user instruction, the one or more missing attributes comprising required attributes of the pre-defined structure that are missing from the structured user instruction;
   requesting the one or more missing attributes from a user;
   receiving the one or more missing attributes from the user; and
   updating the structured user instruction to include the one or more missing attributes received from the user.

13. A non-transitory computer readable medium comprising logic that, when executed by processing circuitry, causes the processing circuitry to perform actions comprising:
   receiving a user instruction in natural language;
   applying one or more natural language processing rules to identify and remove noise from the user instruction in natural language to yield a refined instruction, wherein the removed noise comprises a phrase within the user instruction in natural language;
   processing the refined instruction to yield a structured user instruction, wherein the processing comprises identifying attributes in the refined instruction and arranging the attributes according to a structured format;
   determining a pre-defined structure that maps to the structured user instruction, the pre-defined structure that maps to the structured user instruction identified from a group of pre-defined structures, the pre-defined structure that maps to the structured user instruction identified based on at least one of the attributes of the structured user instruction;
   obtaining a code template associated with the pre-defined structure that maps to the structured user instruction; and
   using the code template to generate software code that implements functionality of the structured user instruction according to syntax of a programming language.

14. The non-transitory computer readable medium of claim 13, wherein the pre-defined structure that maps to the structured user instruction is associated with a plurality of code templates, each code template comprising a different programming language, and wherein actions further comprise selecting the code template used to generate the software code based at least in part on its programming language.

15. The non-transitory computer readable medium of claim 13, the actions further comprising:
   obtaining a second code template associated with the pre-defined structure that maps to the structured user instruction; and
   using the second code template to generate second software code that implements the functionality of the structured user instruction according to syntax of a second programming language.

16. The non-transitory computer readable medium of claim 13, wherein the pre-defined structure that maps to the structured user instruction indicates a plurality of required attributes of the structured user instruction, and wherein the actions further comprise:
   determining one or more missing attributes of the structured user instruction, the one or more missing attributes comprising required attributes of the pre-defined structure that are missing from the structured user instruction;
   requesting the one or more missing attributes from a user;
   receiving the one or more missing attributes from the user; and
   updating the structured user instruction to include the one or more missing attributes received from the user.

17. The non-transitory computer readable medium of claim 13, wherein the actions further comprise:
   receiving a second user instruction in natural language;
   performing processing of the second user instruction to yield a second structured user instruction;
   determining that the second structured user instruction does not map to any pre-defined structure in the group of pre-defined structures; and
   in response to determining that the second structured user instruction does not map to any pre-defined structure in the group of pre-defined structures, using the second structured user instruction to train a machine learning model.

* * * * *